United States Patent [19]

Winnek

[11] Patent Number: 4,488,795
[45] Date of Patent: Dec. 18, 1984

[54] CAMERA FOR THREE-DIMENSIONAL PORTRAITURE

[76] Inventor: Douglas F. Winnek, 80 Laurel Dr., Carmel Valley, Calif. 93924

[21] Appl. No.: 417,816

[22] Filed: Sep. 13, 1982

[51] Int. Cl.³ .............................................. G03B 35/08
[52] U.S. Cl. .................................... 354/115; 354/233
[58] Field of Search ............... 354/112, 113, 114, 115, 354/116, 117, 233

[56] References Cited

U.S. PATENT DOCUMENTS 3,521,947  7/1970  Jones .................................... 354/115
3,683,773  8/1972  Dudley ................................. 354/112
4,180,313 12/1979  Inuiya .................................. 354/112

Primary Examiner—A. A. Mathews
Attorney, Agent, or Firm—Townsend and Townsend

[57] ABSTRACT

A camera for taking portraits including a main lens designed for normal operation at infinity. The lens has a conventional shutter and an aperture member provided with a slit aperture having a width of about 3.5" and a height of about 0.75". A portrait lens is in front of the main lens to enable the lens to receive parallel light rays representing the image of a subject in a datum plane. A lenticular screen is behind the main lens and defines a film plane at which a photographic film can be placed. A field lens is immediately ahead of the lenticular screen to normalize the converging light rays from the main lens. The lenticular screen has a pitch in the range of 50 to 300 lenticules per linear inch. The lenticules can be vertical or inclined.

11 Claims, 3 Drawing Figures

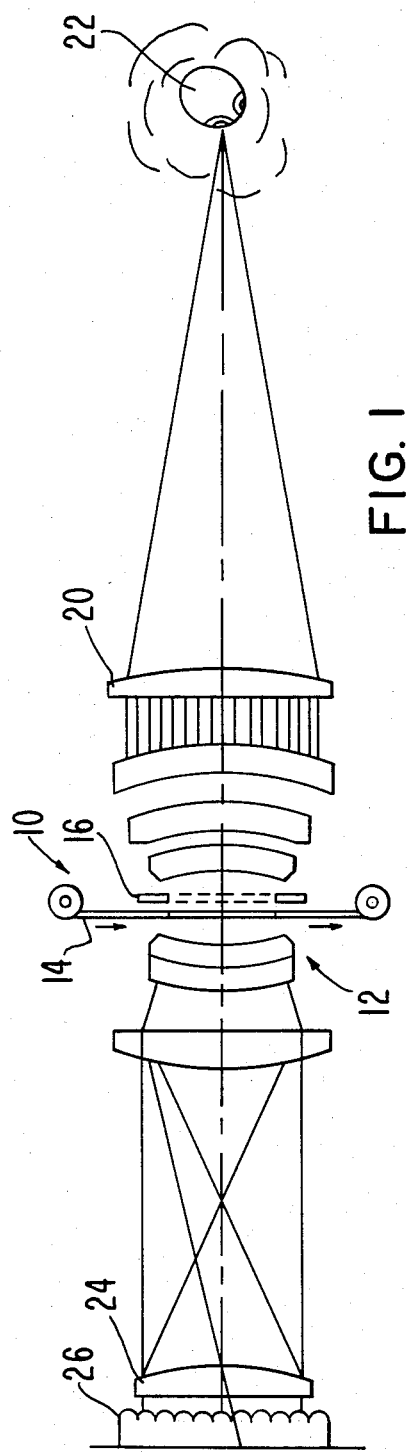
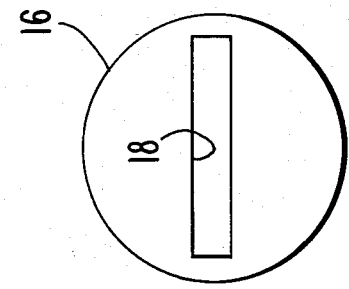
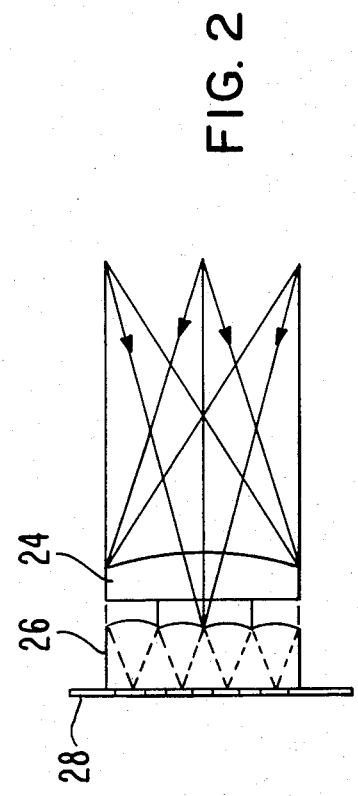

CAMERA FOR THREE-DIMENSIONAL PORTRAITURE

This invention relates to improvements in portraiture cameras and, more particularly, to a camera for taking portraits which can be viewed in three dimensions.

BACKGROUND OF THE INVENTION

The making of three-dimensional portraits has been attempted in the past but has resulted only in one camera system which is extremely complex in construction and has a number of moving parts. In this camera system, a ribbon having a vertical slit therethrough is movable across a lens assembly of the camera system while a lenticular screen in front of a film plane behind the lens assembly is moved a single pitch line, i.e., the distance between a pair of adjacent lenticules of the lenticular screen. Thus, two parts of the camera system must be moved while the other parts of the system remain stationary. This requires a complex mounting system for the movables parts and the quality of the resulting photographs is not sufficient to warrant the expense of such a system.

Because of the aforesaid drawbacks, a need for an improved camera for three-dimensional portraiture exists. The present invention fills the need as hereinafter described.

SUMMARY OF THE INVENTION

The present invention is directed to a camera having a main lens system provided with a shutter, the main lens being designed for normal operation at infinity and being well corrected for a flat field. A stationary aperture member having an aperture therein allows light rays to pass through the main lens toward and through a lenticular screen at a location spaced rearwardly of the main lens. A film plane is at the rear flat face of the lenticular screen.

A portrait lens is used in front of the main lens to allow the main lens to operate at its designed infinity setting. A field lens between the main lens and the lenticular screen normalizes the light rays from the main lens before they reach the lenticular screen. Except for the shutter, the camera of the present invention has no moving parts, is simple and rugged in construction, and photographs taken with the camera are pseudoscopic which can be made stereoscopic by use of an image reversing contact printer.

The primary object of the present invention is to provide an improved camera for three-dimensional portraiture wherein the camera is simple and rugged in construction, has no moving parts except for a shutter, and can be operated with minimum skills to result in the taking of quality photographs.

Other objects of this invention will become apparent as the following specification progresses, reference being had to the accompanying drawing for an illustration of the invention.

In the Drawing:

FIG. 1 is a schematic view of the camera of the present invention for making three-dimensional portraits;

FIG. 2 is an enlarged, fragmentary schematic view of the camera showing the transparent lenticular screen and a field lens in front of the film plane of the camera; and FIG. 3 is a front elevational view of an aperture member which is part of the camera of the present invention.

The camera of the present invention is broadly denoted by the numeral 10 and includes a six-element main lens 12 having a shutter 14 near the central part of the lens 12, and an aperture member 16 shown in more detail in FIG. 3. The camera has been designed for normal operation of lens 12 at infinity and the lens 12 is well corrected for a flat field. The lens typically is a 12" focal length/f2.5 Ektar aero lens and the shutter is of conventional design.

The aperture member 16 is immediately forwardly of the shutter 14 at the center of lens 12. Member 16, which is between the two principal planes of the camera has a slit 18 (FIG. 3) which is generally rectangular in shape. A typical dimension for slit 18 is 3.5" in length and 0.75" in height.

A portrait or first lens 20 is used in advance of lens 12 to enable camera 10 to work at its design infinity setting. Lens 20 is a plano-convex spherical lens and has a typical focal length of 40". The portrait lens is used for subject (the principal subject plane in focus at 40") from the front principal plane of the front lens element of lens 12. Other portrait lenses having focal lengths of 30" and 50" provide for convenient means of changing the subject distance for appropriate image sizes. The subject 22 to be photographed is shown forwardly of portrait lens 20.

A field lens 24 is rearwardly of lens 12 and is a plano-convex cylindrical lens placed in front of a transparent lenticular screen 26 to normalize the converging bundles of light rays so that the lenticular fields of lenticular screen 26 are filled more uniformly. Lenticular screen 26 typiclly has vertical lenticules which serve as the cylindrical lenses to divide the total field into incremental fields in the horizontal direction. However, the lenticules can be inclined, if desired, for special applications. The field lens and lenticular screen are shown in more detail in FIG. 2.

The main lens 12 forms the image which, in turn, becomes the object for lenticular screen 26. The lenticular screen may be of any pitch (50 to 300 cylindrical lenses per linear inch). Preferably, a lenticular screen of 200 lenses per inch is provided for portraiture work. The field of view of a single lens should be matched by the total angle of convergence of light rays projected by the slit 18 on the horizontal axis.

A photographic film 28 is placed at the rear flat face of lenticular screen 26. Film 28 is exposed when shutter 14 is opened and light emanating from subject 22 passes through the camera and through the lenticular screen 26 to the film plane of the camera. FIGS. 1 and 2 show the way in which the light ray pass from subject 22 into and through lenticular screen 26.

As shown in FIG. 1, the part of the camera which lies ahead of field lens 24 constitutes a normal but high quanlity camera lens except for aperture member 16 which reduces the energy in the vertical direction by a factor such as a factor of about 24. This factor has been determined empirically, but it is clear that 24 is the right order of magnitude to balance the effect of the lenticular screen 26. The result of the use of the front lens elements up to the field lens is a bundle of rays diverging slightly in the horizontal cross-section and diverging sharply in the vertical direction. The light rays coming to a focus at the film plane come from all parts of the illuminated aperture 18 of member 16 and converge to focus so as to form a sharp image of all objects at or near the datum plane, i.e., the front focal plane in the subject 22.

FIG. 2 shows the effect of field lens 24. Light ray traces have been made through two surfaces of lens 24 at several strategic points. From FIG. 2, it is clear that the primary effect of field lens 24 is to bend the rays so that the central ray in each bundle which converges to form a sharp point is essentially perpendicular to the film plane. Lens 24 also changes the magnification in the horizontal axis so that it is non-linear from the center of the picture out to the edges. However, this effect is sufficiently small such that it does not disturb the appearance of the reproduction.

In use, film 28 is placed directly against the back surface of lenticular screen and therefore, refraction of the back plane does not have significant effects. Thus, the analysis reduces to calculations of the image forming properties of the cylindrical lenticules of lenticular screen 26. Main lens 12 and field lens 24 are adjusted to give a sharp image of the datum plane on a ground glass member at the film plane. Objects in front of and behind the datum plane will then focus sharp images respectively behind and in front of the ground glass screen. This is in accordance with the basic system formula as follows:

$$(1/P) + (1/Q) = (1/F_{eff})$$

where the overall system of lenses has been replaced for simplicity with a single lens of effective focal length $F_{eff}$. P and Q are, respectively, the object distance measured from the front surface of the effective lens and the image distance measured from the second principal plane of the effective lens. Simple measurements of the relative displacement of the image with a given displacement of the object using a 40" portrait lens and a field lens showed an approximate relationship of:

$$\Delta Q = (1/3.6) \times \Delta P$$

Thus, objects displaced from the datum plane by 3.6" will image at ±1" from the ground glass screen.

Camera lens 12 has a typical focal length of 12". The angle subtended by aperture 18 attained by any line element on the negative is, then, very minute (only minutes of arc). Because of this small angle and because of the effects of the lenticular screen 26, the horizontal focus appears to be very uncritical and the defocusing effect of the field lens 24 can be compensated during the adjustment for best focus.

It should be noted that, when a photograph has been taken through lenticular screen 26 and viewed, after processing, through the lenticular screen and held against it, the image on the photograph will appear in reverse relief, i.e. pseudoscopic, not stereoscopic. The image therefore must be printed in a reversing contact print to produce the stereoscopic prints for portraiture.

What is claimed is:

1. A camera for three-dimensional portraiture comprising: a multi-element main lens having a shutter between a pair of elements of the main lens, said main lens being adapted for normal operation at infinity; an aperture member between the shutter and the next adjacent element of said main lens, said aperture member provided with a fixed aperture therein to allow light rays to pass through the main lens when the shutter is opened; a first lens in advance of the main lens, the first lens having a predetermined focal length; a lenticular screen on the opposite side of the main lens, the lenticular screen having a plurality of lenticules on the front face thereof, there being a film plane adjacent to the rear surface of the lenticular screen at which a photographic film can be placed; and a field lens between the main lens and the lenticular screen to normalize the light rays from the main lens.

2. A camera as set forth in claim 1, wherein the focal length of the first lens is in the range of 30 to 50".

3. A camera as set forth in claim 1, wherein the focal length of the main lens is approximately 12".

4. A camera as set forth in claim 1, wherein the aperture of said aperture member is generally rectangular.

5. A camera as set forth in claim 3, wherein the aperture has a width of approximately 3.5" and a height of approximate 0.75".

6. A camera as set forth in claim 1, wherein the lenticular screen has a pitch in the range of 50 to 300 lenticules per inch.

7. A camera as set forth in claim 1, wherein the first lens is a plano-convex spherical lens.

8. A camera as set forth in claim 1, wherein the field lens is a plano-convex cylindrical lens.

9. A camera as set forth in claim 1, wherein the lenticules of the lenticular screen are generally vertical.

10. A camera as set forth in claim 1, wherein the lenticules of the lenticular screen are parallel with each other and are generally inclined with respect to the vertical.

11. A camera as set forth in claim 1, wherein the first lens has a focal length in the range of 30" to 50", said aperture having a width of about 3.5" and a height of about 0.75", said lenticular screen having a pitch in the range of 50 to 300 lenticules per linear inch, the first lens being a plano-convex spherical lens and the field lens being a plano-convex cylindrical lens.

* * * * *